United States Patent [19]

Terashima et al.

[11] Patent Number: 4,629,582
[45] Date of Patent: Dec. 16, 1986

[54] GREEN-EMITTING PHOSPHOR

[75] Inventors: Kenji Terashima, Chigasaki; Yoshio Kimura, Yokohama; Masao Asada, Yokohama; Satoshi Sugano, Yokohama, all of Japan

[73] Assignee: Tokyo Shibaura Denki Kabushiki Kaisha, Kawasaki, Japan

[21] Appl. No.: 693,317

[22] PCT Filed: Jun. 16, 1982

[86] PCT No.: PCT/JP82/00229

§ 371 Date: Feb. 14, 1983

§ 102(e) Date: Feb. 14, 1983

[87] PCT Pub. No.: WO82/04438

PCT Pub. Date: Dec. 23, 1982

Related U.S. Application Data

[63] Continuation of Ser. No. 466,354, Feb. 14, 1983, abandoned.

[30] Foreign Application Priority Data

Jun. 16, 1981 [JP] Japan ............................ 56-91555

[51] Int. Cl.$^4$ .............................................. C09K 11/08
[52] U.S. Cl. ........................ 252/301.4 P; 252/301.4 F
[58] Field of Search .................. 252/301.4 F, 301.4 P

[56] References Cited

U.S. PATENT DOCUMENTS 3,481,884 12/1969 Palilla et al. .................. 252/301.4 P
4,151,443 4/1979 Van den Boom et al. ... 252/301.4 F X
4,208,611 6/1980 Watanabe et al. ........... 252/301.4 F X

FOREIGN PATENT DOCUMENTS 2534834 2/1976 Fed. Rep. of Germany .... 252/301.4 P
54-68784 6/1979 Japan .............................. 252/301.4 P
55-52378 4/1980 Japan .............................. 252/301.4 F Primary Examiner—Gary P. Straub
Attorney, Agent, or Firm—Cushman, Darby and Cushman

[57] ABSTRACT

A green-emitting phosphor is activated by cerium and terbium and is represented by the general formula:

$$(Re_{1-a-b-3c}Tb_aCe_bA_{3c})_2O_3 \cdot mP_2O_5 \cdot nSiO_2$$

wherein Re is at least one member selected from the group consisting of yttrium, lanthanum, and gadolinium; A is at least one member selected from the group consisting of lithium (Li), sodium (Na), potassium (K), rubidium (Rb), and cesium (Cs); and $a>0$, $b>0$, $c>0$, $0<a+b+3c<1$, $1\times10^{-5}\leq c\leq5\times10^{-2}$, $m>0$, and $n>0$.

The green-emitting phosphor of the invention may be widely applied to fluorescent lamps for copying machine light sources, or high luminous efficacy and high color rendering property fluorescent lamps such as three peak emission system fluorescent lamps.

2 Claims, 1 Drawing Figure

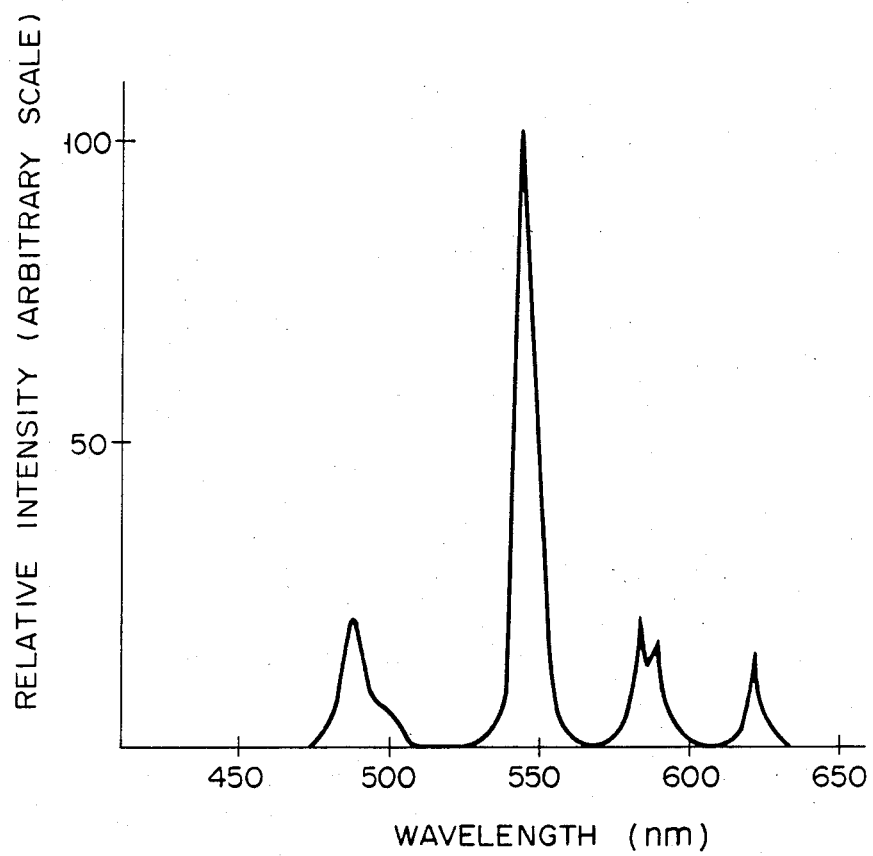

GREEN-EMITTING PHOSPHOR

This is a continuation, of application Ser. No. 466,354, filed Feb. 14, 1983, which was abandoned upon the filing hereof.

TECHNICAL FIELD

The present invention relates to a green-emitting phosphor.

BACKGROUND ART

As a means for simultaneously improving color rendering properties and light output, the three peak emission system is known which uses blue, green and red light-emitting phosphors having relatively narrow light-emission spectra and mixed in a predetermined ratio. In a flourescent lamp of this type which uses a mixture of three types of phosphors emitting light of significantly different colors, misregistration of colors is caused by the difference in decreases in light outputs of the respective phosphors after some operation time of the lamp. The misregistration degrades the product quality of the lamp.

With recent development in office equipment, the number of copying machines used is increasing. Especially, copying machines using fluorescent lamps as light sources are prevailing so much in view of energy conservation. In a copying machine of this type, a decrease in the light output after some ON time of the fluorescent lamp as the light source gives rise to a decrease in the copying speed. For this reason, the decrease in the light output over ON time counts more than the initial light output. However, the flourescent lamps as light sources which are used under high load experience more decreases in light output than the general fluorescent lamps.

An yttrium silicate phosphor $\{(Ye, Ce, Tb)_2O_3 \cdot SiO_2\}$ activated by cerium and terbium emits green light and has high luminous efficacy, and is therefore used as a fluorescent lamp of the three peak emission type or a flourescent lamp as a copying machine light source. Although the yttrium silicate phosphor has high luminous efficacy, it goes through a relatively great decrease in the light output after some ON time.

The present invention has been made in consideration of this and has for its object to provide a novel green-emitting phosphor in which a decrease in light output during ON time is reduced to the minimum.

DISCLOSURE OF INVENTION

The present invention provides a green-emitting phosphor which is activated by cerium and terbium and which is represented by the general formula:

$$(Re_{1-a-b-3c}Tb_aCe_bA_{3c})_2O_3 \cdot mP_2O_5 \cdot nSiO_2$$

wherein Re is at least one member selected from the group consisting of ytttrium, lanthanum, and gadolinium; A is at least one member selected from the group consisting of lithium (Li), sodium (Na), potassium (K), rubidium (Rb), and cesium (Cs); and $a>0$, $b>0$, $c>0$, $0<a+b+3c<1$, $1\times10^{-5}\leq c\leq 5\times10^{-2}$, $m>0$, and $n>0$.

In the general formula $(re_{1-a-b-3c}Tb_aCe_b A_{3c})_2O_3 \cdot mP_2O_5 \cdot nSiO_2$, c represents the molar concentration of an alkaline metal defined by A. When the molar concentration c is below $1\times10^{-5}$, effect of addition of the alkaline metal cannot be obtained. On the other hand, if the molar concentration c exceeds $5\times10^{-2}$, the solid phase reaction of the alkaline metal is overly facilitated to make control of the solid reaction difficult.

BRIEF DESCRIPTION OF DRAWING

The accompanying FIGURE shows the spectrum of a phosphor according to an example of the present invention.

BEST MODE OF CARRYING OUT THE INVENTION

A fluorescent lamp of 38 W, i.e., FL-40. G/38 was manufactured using a phosphor of the present invention and following the conventional procedures. The obtained lamp was operated at a high load which was 30% higher than the rated load, and the decrease in the light output after 1,000 hour ON time was measured. As a result, the phosphor exhibited only 5 to 12% decrease in the light output while the conventional yttrium silicate phosphor activated by cerium and terbium represented by $\{(Y, Ce, Tb)_2O_3 \cdot SiO_2)\}$ exhibited 15% decrease. The phosphor of the present invention thus shows a considerable improvement in this respect. The light output of the phosphor of the present invention after 1,000 hour ON time is 107% at maximum when that of the conventional yttrium silicate phosphor activated with cerium and terbium was defined as 100%.

Since a phosphor of the present invention is a green-emitting substance having such practical advantages, it may be generally applied to various types of fluorescent lamps requiring green-emitting substances.

The present invention will now be described by way of its examples.

EXAMPLE 1

A ball mill or the like was charged with 12.37 g of lanthanum oxide ($La_2O_3$), 100.6 g of cerium oxide ($CeO_2$), 31.21 g of terbium oxide ($Tb_4O_7$), 99.21 g of diammonium hydrogenphosphate ($(NH_4)_2HPO_4$), 5.00 g of silicon dioxide ($SiO_2$), 0.1210 g of lithium fluoride (LiF). The raw materials were pulverized and well mixed. The resultant mixture was placed in a crucible and was calcined in a nitrogen atmosphere at 1,000° C. for 1.5 hours. The resultant calcined body was pulverized and was charged into another crucible. After placing 30 g of carbon powder on the calcined body, the crucible was sealed and the contents therein were calcined in a nitrogen atmosphere at 1,350° C. for 5 hours. After calcination, the carbon powder was removed, and the resultant calcined body was pulverized and was rinsed well with warm pure water at 70° to 90° C. The resultant powder was filtered and was dried. The dried powder was charged into still another crucible and was then calcined again for 5 hours in a reducing atmosphere at 1,350° C. consisting of 95% by volume of nitrogen and 5% by volume of hydrogen.

The resultant phosphor had a composition $La_{0.091}Ce_{0.7}Tb_{0.2}Li_{0.009})_2O_3.0.9P_2O_5.0.2SiO_2$. This phosphor emits strong green light having a peak in the vicinity of 545 nm upon excitation with ultraviolet rays. The figure shows the spectrum distribution of this phosphor. In this example, LiF was used as the lithium compound.

However, similar effects may be obtained if the resultant phosphor has the general formula given above indendently of the type of lithium compound.

A fluorescent lamp of 38 W, i.e., FL-40S G/38 was manufactured using the phosphor obtained in this manner. The lamp was operated for 1,000 hours under a high load which was 30% higher than the rated load. The decrease in the light output and the light outout after 1,000 hours were measured.

As a Comparative Example, a lamp was manufactured, operated and measured for its decrease in the light output and the light output under the same conditions except that a conventional yttrium silicate phosphor activated by cerium and terbium and represented by {(Y, Ce, Tb)$_2$O$_3$SiO$_2$} was used. The lamp of Comparative Example underwent a decrease in light output of 15%, while the lamp of the phosphor of Example 1 only experienced a decrease of 10%. The light output of the lamp of Example 1 was 105% when that of the conventional phosphor was defined as 100%.

The decrease in the light output after 1,000 hour ON time with respect to that in the initial ON time of the lamp is indicated in %, and the phosphor of Example 1 is improved by 5% over that of Comparative Example.

EXAMPLE 2

A ball mill or the like was charged with 85.16 g of lanthanum oxide (La$_2$O$_3$), 14.75 g of cerium oxide (CeO$_2$), 32.04 g of terbium oxide (Tb$_4$O$_7$), 107.5 g of diammonium hydrogenphosphate ((NH$_4$)$_2$HPO$_4$), 2.50 g of silicon dioxide (SiO$_2$), and 7.190 g of potassium chloride (KCl). The raw materials were pulverized and well mixed. The resultant mixture was calcined under the same conditions as those in Example 1.

The resultant phosphor had a composition (La$_{0.61}$Ce$_{0.1}$Tb$_{0.2}$K$_{0.09}$)$_2$O$_3$.0.95P$_2$O$_5$.0.10SiO$_2$. The phosphor emits strong green light having a peak in the vicinity of 545 nm upon excitation with ultraviolet rays.

A lamp was manufactured following the same procedures as in Example 1, and the decrease in the light output and the light output were measured after 1,000 hour ON time. The decrease in the light output was 11%, and the light output was 104%.

Table 1 show the obtained results with 10 phosphors including Examples 3, 4, 5, 6, 7, 8 and 9 which were manufactured following the same procedures as in Examples 1 and 2, and also including Examples 1 and 2.

The characteristics of each example are improved by repeating reduction and calcination.

TABLE 1

| Example | Phosphor Composition | Decrease in light output (%) | Light output (%) |
|---|---|---|---|
| 1 | (La$_{0.091}$Ce$_{0.7}$Tb$_{0.2}$Li$_{0.009}$)$_2$O$_3$.0.9P$_2$O$_5$.0.2SiO$_2$ | 10 | 105 |
| 2 | (La$_{0.61}$Ce$_{0.1}$Tb$_{0.2}$K$_{0.09}$)$_2$O$_3$.0.95P$_2$O$_5$.0.1SiO$_2$ | 11 | 104 |
| 3 | (La$_{0.50}$Y$_{0.11}$Ce$_{0.178}$Tb$_{0.21}$Na$_{0.002}$)$_2$O$_3$.0.8P$_2$O$_5$.0.4SiO$_2$ | 9 | 103 |
| 4 | (Y$_{0.15}$Gd$_{0.10}$Ce$_{0.597}$Tb$_{0.15}$Cs$_{0.003}$)$_2$O$_3$.0.98P$_2$O$_5$.0.04SiO$_2$ | 12 | 101 |
| 5 | (La$_{0.1}$Gd$_{0.05}$Ce$_{0.64}$Tb$_{0.2}$Li$_{0.01}$)$_2$O$_3$.0.75P$_2$O$_5$.0.5SiO$_2$ | 5 | 102 |
| 6 | (La$_{0.12}$Ce$_{0.62}$Tb$_{0.25}$K$_{0.01}$)$_2$O$_3$.0.9P$_2$O$_5$.0.2SiO$_2$ | 11 | 107 |
| 7 | (La$_{0.1}$Ce$_{0.69}$Tb$_{0.2}$Cs$_{0.01}$)$_2$O$_3$.0.9P$_2$O$_5$.0.2SiO$_2$ | 9 | 104 |
| 8 | (La$_{0.1}$Ce$_{0.50}$Tb$_{0.3}$Li$_{0.1}$)$_2$O$_3$.0.95P$_2$O$_5$.0.1SiO$_2$ | 11 | 105 |
| 9 | (La$_{0.05}$Gd$_{0.05}$Ce$_{0.69}$Tb$_{0.2}$Cs$_{0.01}$)$_2$O$_3$.0.9P$_2$O$_5$.0.2SiO$_2$ | 11 | 103 |
| 10 | (La$_{0.4}$Ce$_{0.3999}$Tb$_{0.2}$Rb$_{0.0001}$)$_2$O$_3$.0.85P$_2$O$_5$.0.3SiO$_2$ | 8 | 102 |

INDUSTRIAL APPLICABILITY

The phosphors of the respective Examples described above are green-emitting phosphors having peaks in the vicinity of 545 nm, which have smaller decrease in the light output after some ON time, and which may be suitably adapted for fluorescent lamps for copying machine light sources or high luminous efficacy and high color rendering property fluorescent lamp such as a three peak emission system fluorescent lamp.

We claim:

1. A green-emitting phosphor consisting of rare earth metal, terbium, cerium, alkali metal, phosphate and silicate, represented by the general formula:

$$(Re_{1-a-b-3c}Tb_aCe_bA_{3c})_2O_3.mP_2O_5.nSiO_2$$

wherein Re is one member selected from the group consisting of yttrium, lanthanum, and gadolinium or mixtures thereof; A is one member selected from the group consisting of lithium (Li), sodium (Na), potassium (K), rubidium (Rb), and cesium (Cs) or mixtures thereof; and wherein a>0, b>0, c>0, 0<a+b+3c<1, $1\times10^{-5} \leq c \leq 5\times10^{-2}$, and m≧0.75 and n≧0.04, and the sum of m and ½n equals about 1.

2. A green-emitting phosphor consisting essentially of rare earth metal, terbium, cerium, alkali metal, phosphate and silicate, represented by the general formula:

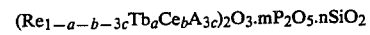

$$(Re_{1-a-b-3c}Tb_aCe_bA_{3c})_2O_3.mP_2O_5.nSiO_2$$

wherein Re is one member seleceted from the group consisting of yttrium, lanthanum, and gadolinium or mixtures thereof; A is one member selected from the group consisting of lithium (Li), sodium (Na), potassium (K), rubidium (Rb), and cesium (Cs) or mixtures thereof; and wherein a>0, b>0, c>0, 0<a+b+3c<1, $1\times10^{-5} \leq c \leq 5\times10^{-2}$, and m>0.75 and n≧0.004, and the sum of m and ½n equals about 1.

* * * * *